Figure 4:
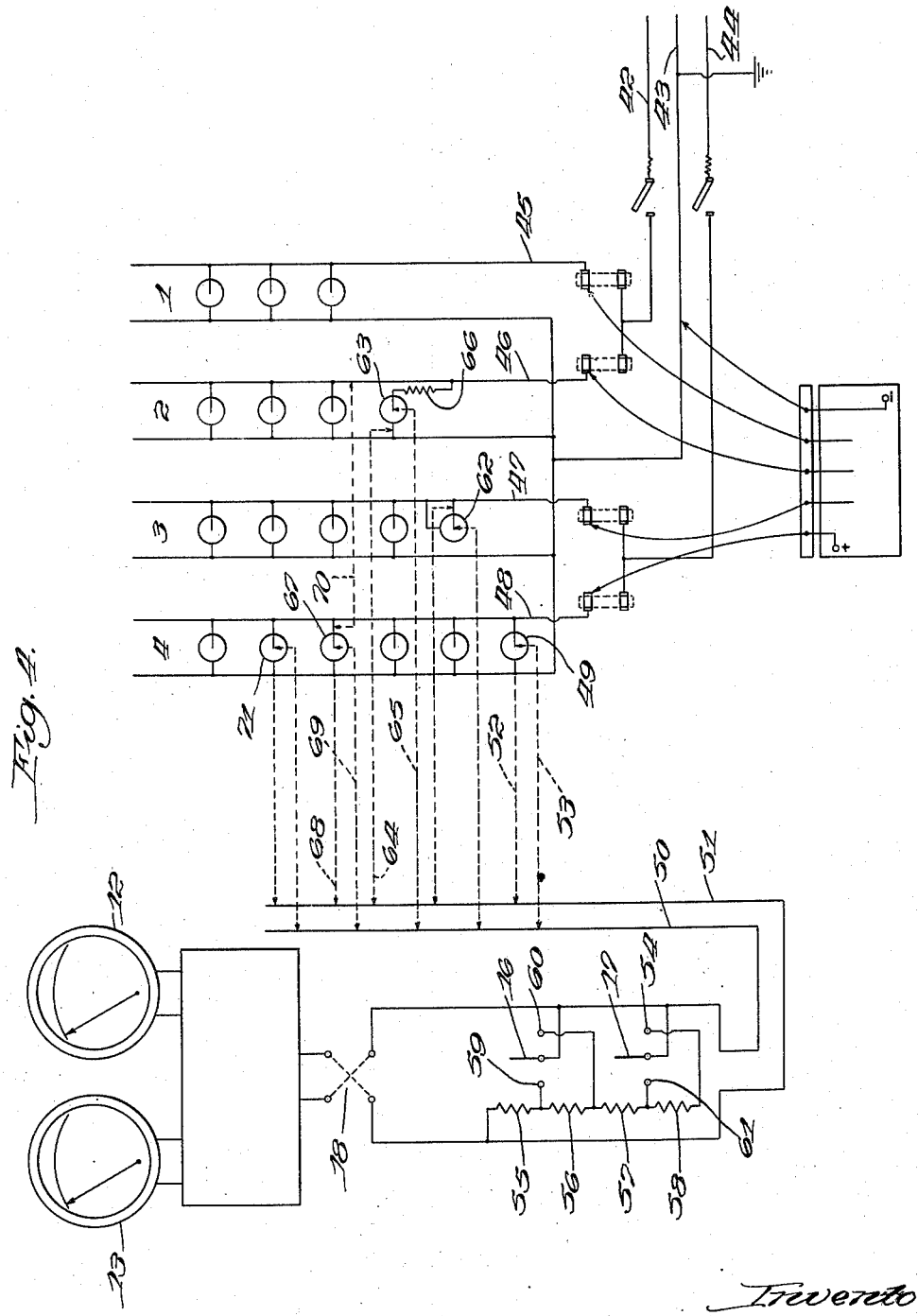

Jan. 9, 1945.   C. M. HORHAM   2,366,789
ELECTRICAL TESTING EQUIPMENT
Filed June 14, 1941   2 Sheets-Sheet 1
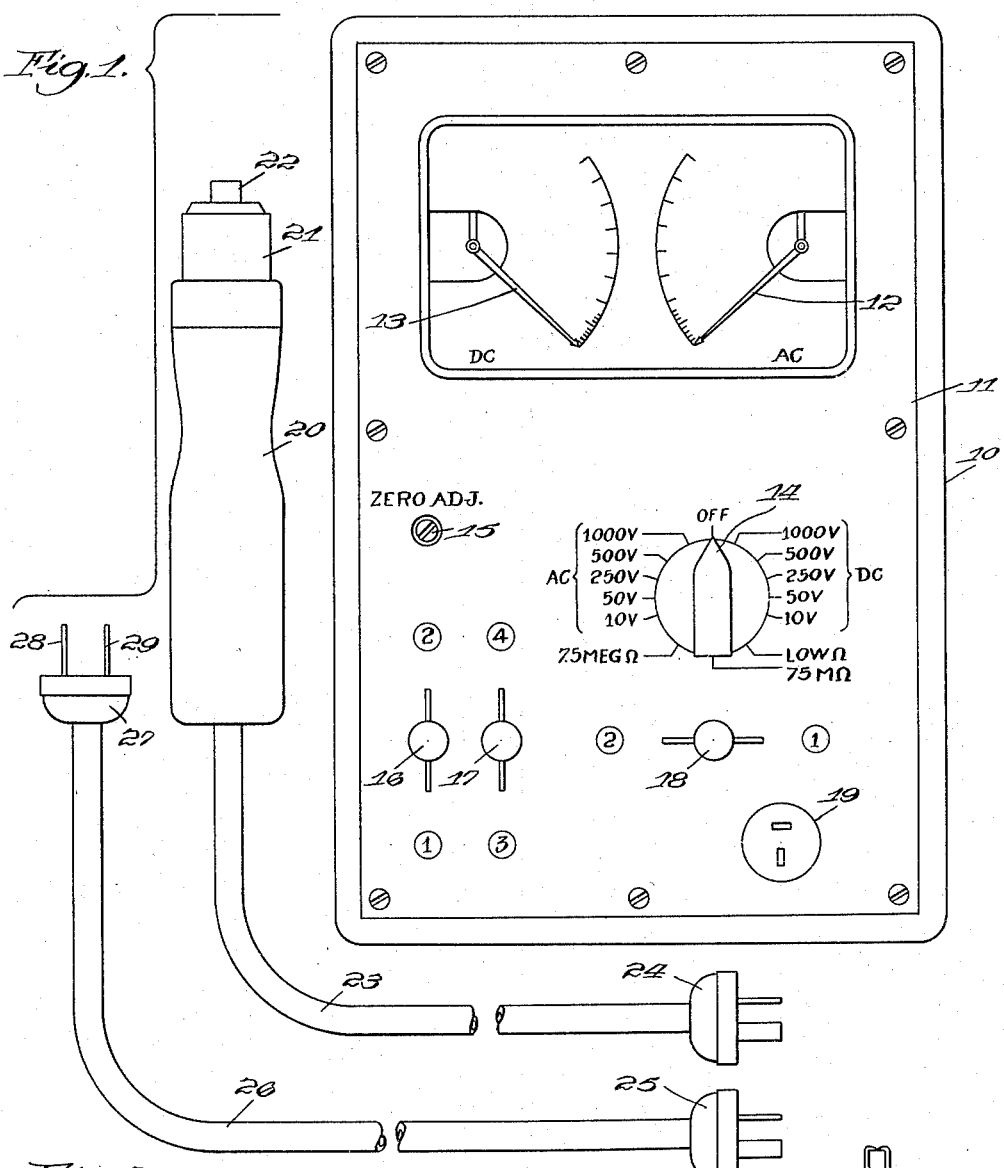
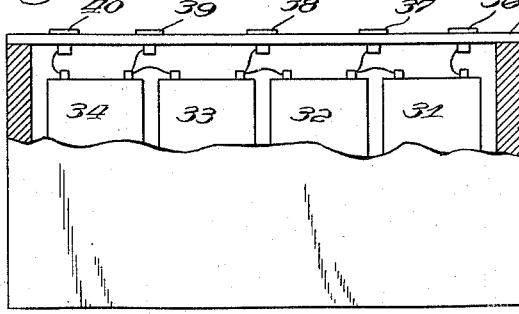
Inventor:
Charles M. Horham.
By Chritton, Wiles, Davies & Hirsch.
Attys.

Jan. 9, 1945.    C. M. HORHAM    2,366,789
ELECTRICAL TESTING EQUIPMENT
Filed June 14, 1941    2 Sheets-Sheet 2

Inventor:
Charles M. Horham,
By Chritton, Wiles, Davies & Hirschl.
Attys.

Patented Jan. 9, 1945

2,366,789

UNITED STATES PATENT OFFICE 2,366,789

ELECTRICAL TESTING EQUIPMENT

Charles M. Horham, Lincoln, Nebr.

Application June 14, 1941, Serial No. 398,155

2 Claims. (Cl. 175—183)

This invention relates to electrical testing equipment, and more particularly to readily portable apparatus for testing various electrical circuits. While the apparatus disclosed and claimed herein is adapted to make tests of any light, heat, power, telephone, telegraph or similar circuits, it was particularly designed to facilitate inspection and testing of domestic and commercial light, heat and power circuits, and finds its greatest usefulness in such work.

One feature of this invention is that it provides readily portable apparatus capable of making all of the tests heretofore usually made on domestic circuits, for example, and certain additional highly desirable tests; another feature of this invention is that, with a single test procedure, it enables determination of all of the various factors which it may be desirable to expect in new or old wiring installations; a further feature of this invention is that it enables determination of which of several circuits a number of different outlets may be connected to; still another feature of this invention is that it provides an indication of whether the proper size wire has been used, and whether the connections have been properly made; other features and advantages of this invention will be apparent from the following specification and the drawings, in which:

Figure 1 is an elevational view of the indicating portion of test equipment embodying my invention; Figure 2 is an elevational view, partly broken away, of another part of my testing equipment; Figure 3 is a view of a convenient connector cable; and Figure 4 is a schematic diagram of the way in which my electrical testing equipment is used.

Although, as mentioned above, my testing equipment is adapted to be used on almost any kind of circuit or circuit combination, for purposes of clarity of description it is here shown in a form particularly designed to test household or domestic lighting and power circuits, and it will be described in connection with such use. Previous test equipment for inspection or testing of new or old wiring installations has usually been cumbersome and incomplete, requiring a great deal more time and work for such tests as were accomplished, and failing to provide certain highly desirable information. Test equipment has heretofore been known, for example, for determining the condition of a local ground, the polarity of connections at a given outlet socket, and circuit continuity to such outlet. But test equipment heretofore used has failed to show which of several circuits in a given installation was connected to a given outlet, unless each individual circuit was laboriously followed through individually; and it completely failed to provide a conveniently obtainable indication of circuit resistance, enabling determination of whether too small a size of wire had been used for the length of circuit, or certain connections poorly made. My test equipment furnishes this additional information, and enables very quick and thorough inspection or testing of wiring installations, either to determine whether certain standards have been met, or whether the work has been properly done by a subcontractor, for example.

Describing now the particular embodiment of my invention illustrated herewith, a readily portable carrying case 10 has mounted on its panel 11 an A. C. voltmeter 12 and a D. C. voltmeter 13. In accordance with known practice in such instruments, they are connected to a selector switch 14 enabling various A. C. voltages to be read by the A. C. meter, various D. C. voltages to be read by the D. C. meter, and also enabling determination of resistance values. The various settings of the selector switch 14 are all apparent and marked on the panel of the device, so that they will not be identified by reference numerals. Also in accordance with known practice, the instrument may be provided with one or more zero adjustments for the meters in various uses, one such zero adjustment being here shown as a rotatable screw 15. In addition, the unit is also provided with a pair of double-throw single-pole key switches 16 and 17, these switches preferably being of the type which normally remains in central or open circuit position, and must be held in either of their respective two circuit closing positions; and another key or cam switch 18 which is preferably of the type that will stay in either position to which it is thrown, or is normally in one circuit closing position and when moved to the other position must be held in such other position. This latter switch is of the double-pole double-throw type, used for reversing polarity, for purposes which will appear hereafter.

The unit is also provided at some convenient place with a socket 19 of a polarized type. That is, the socket is adapted to receive a cooperating plug in only one position, so that there can never be a reversal of leads in a circuit connected to the unit by being plugged into this socket. Two different types of connecting means are provided, as shown in Figure 1. The first of these is adapted to be received by a socket outlet, and comprises a handle member 20 of insulating material provided at one end with a shell 21 and a center contact 22. This is adapted to be pushed up into a standard socket and to make contact with its shell and center terminal. The elements 21 and 22 are connected by a flexible cord or cable 23 to a polarized plug 24 adapted to be received by the socket 19. The elements 21 and 22, therefore, are electrically connected to the apparatus within the unit 10, this connection always bearing a predetermined relation. Another connector is provided adapted to be interchangeably connected to the unit by having the plug 25 inserted in the socket 19, this plug being connected by a cable or cord 26 to another plug 27 having conventional prongs 28 and 29 adapted to be inserted in a wall receptacle or similar bayonet-receiving outlet. By the use of one or the other of these connectors the unit 10, as may be readily seen, can be placed in electrical connection with any conventional outlet of a domestic wiring system.

Another and separate readily portable unit is necessary to the practice of my invention, this being shown in Figure 2 and identified by the reference numeral 30. This unit comprises an appropriate carrying case or container adapted to house a plurality of standard wet cells, storage battery cells of the type having an accurately predetermined voltage and considerable current-producing capacity, these cells here being identified as 31, 32, 33 and 34. At some convenient place, as the top of the unit, a connector strip 35 is provided having sockets 36, 37, 38, 39 and 40. The negative terminal of cell 31 is preferably connected to socket 36; the positive terminal of cell 31 is connected to the negative terminal of cell 32, and both connected to socket 37; the positive and negative terminals of cells 32 and 33 and 33 and 34 are also similarly connected together and to the respective sockets 38 and 39; and the positive terminal of cell 34 is connected to socket 40. For convenience of connections which are to be made to this unit, I employ five connector cords similar to the one identified as 41 and shown in Figure 3. This is a single wire cord terminating at one end in a plug adapted to be received by one of the sockets, and at the other end in a claw grip which can be conveniently snapped on to a binding post, fuse clip, or the like.

Turning now more particularly to Figure 4, the purposes and use of my invention will be described. The righthand half of Figure 4 illustrates a three-wire 220-volt conventional A. C. system supplying four circuits in a residence or home, for example. The wires 42, 43 and 44, of course, are connected to some regular commercial supply line, the center wire being grounded as indicated, so that there is a difference of 110 volts between each of the wires 42 and 44 and the neutral wire 43. In order to determine whether proper voltage is reaching the distribution point, generally in the basement of the house, the unit illustrated in Figure 1 is preferably connected by jumper wires or the like to the supply wires and the A. C. meter used (with a proper setting of the selector switch 14) to determine the presence of the proper voltage. Determination of whether the local ground is satisfactory may be made by disconnecting it from the neutral wire and making a resistance test (on the lower ohmage setting of the selector switch 14) between it and the neutral wire 43, it being assumed for this purpose that the power line neutral is a true ground. If a high resistance, as more than twenty-five ohms, shows up in this test the local ground is unsatisfactory. First making sure that all current consuming devices are disconnected in the house, a test of insulation resistance or leakage can then be made by using a high resistance setting of the selector switch and connections between the neutral supply wire and each of the respective live or ungrounded wires of the house circuits.

It will thus be apparent that my instrument is readily adapted to make such tests as those mentioned above, now sometimes commercially used. In addition, however, my electrical testing equipment enables quick and convenient testing of the wiring and circuits within the house, and furnishes information not heretofore furnished by equipment for making such tests. The next step in testing by my equipment is to disconnect the local circuits from the power source, as by opening the main service switch or preferably by removing the fuses indicated in dotted lines. By means of jumper wires or connectors (as, for example, of the type shown in Figure 3) the negative side of my battery case (socket 36) is connected to the neutral wire 43; socket 37 is connected to the live wire 45 of a local circuit which will be designated as circuit No. 1; socket 38 is connected to the live wire 46 of circuit No. 2; and sockets 39 and 40 are connected respectively to the live wires 47 and 48 of local circuits 3 and 4. It will be readily apparent that under these conditions there exists in circuit No. 1 a voltage of 2.1 volts (the voltage of a standard wet cell); and that the voltages present in circuits 2, 3 and 4 will be respectively 4.2 volts, 6.3 volts, and 8.4 volts, so that a different voltage is present in each of the four different local circuits. In this regard, it will be understood that four local circuits and four wet cells have been illustrated for purposes of convenience, but that as many cells might be used as there might be circuits desired to be tested.

The inspector or other person using my electrical testing equipment would then take the device shown in Figure 1 with him into the house or residence, and go into the first convenient room. He would then test each outlet in such room, using the appropriate connector for a socket or a bayonet-type receptacle, as the case might be. The inspector would preferably be provided with a form on which determinations made from the unit 10 would be entered. As soon as all of the outlets in one room were tested the inspector would then move on through other rooms in the house, testing each outlet. This testing of outlets need not be done in any particular order, yet when the inspection is finished the data on the form will show just which outlets are on which circuits, whether the proper voltage is present, whether there are any cross connections, whether the outlets are wired with the right polarity, and whether the circuit resistance (determined principally by size of wire and the mechanical condition of the connection) is low enough to be satisfactory.

In order to better explain how this testing is done and how the determinations are indicated by my equipment, a schematic circuit representation of the test equipment (shown in Figure 1) is illustrated on the left side of Figure 4, and a few illustrative tests will now be described.

Assuming that the outlet 49 is a socket in the first room the inspector has entered, as for example the kitchen, the two-wire connector cord 23 would be plugged into the unit 10 and the other end forced into the socket, so that the elements 21 and 22 made connection with the shell and center terminal of the socket respectively, these connections to the two wires 50 and 51 of the cord 23 being indicated in dotted lines 52 and 53. The selector switch 14 is then set on the 10-volt D. C. position, and if circuit continuity is complete to the socket outlet the D. C. meter 13 will read 8.4 volts, indicating that this socket is on No. 4 circuit. If for any reason the outlet should have been reversely wired, with the shell connected to the live wire of the circuit, the meter would not have swung up and indicated any voltage. Under such circumstances the inspector moves reversing switch 18 to its other position, and if in this other position the meter reads the correct voltage it is an indication that circuit continuity is satisfactory but that the polarity of the connections is wrong, which would be noted. If the meter failed to read in either position of the switch 18 it would of course be an indication that there was an open connection or break in the wire somewhere between the outlet 49 and the fuse clip, which fact could also be noted on the data sheet.

Assuming, however, that as first described the D. C. meter swung up immediately to 8.4 volts and indicated circuit continuity and proper polarity of the connections to the socket outlet, the inspector would then want to know whether the wire used in the circuit was too small for the expected load, or whether there are any mechanically imperfect connections. Either of these conditions would show up as a high circuit resistance, and to determine the circuit resistance the inspector would then move switch 17 to its up position, making connection in the unit with the contact 54 and placing across the circuit, in shunt with the meter, the resistors 55, 56, 57 and 58. Four resistors are used to provide four different loads in order that each different circuit voltage will provide the same normal meter deflection under its corresponding load, so that any abnormal deflection will be immediately obvious to the inspector. That is, if the outlet 49 had been on circuit No. 1, switch 16 would be moved down to No. 1 position, making connection with the contact 59 and placing only resistor 55 across the 2.1 volt circuit; if the reading of the meter had indicated the outlet 49 on circuit No. 2, switch 16 would be thrown to the up or No. 2 position to make engagement with the contact 60 to provide a load of double the resistance, corresponding to the double voltage present in the No. 2 circuit. Similarly, switch 17 would be thrown to the No. 3 position to make engagement with the contact 61 if the outlet had been on No. 3 circuit. It will be thus seen that if the switches 16 and 17 are so manipulated as to throw them to a position corresponding to the circuit on which the outlet is indicated to be, there will always be a current flow through the resistors such that the voltage drop across them bears a predetermined relation to the total voltage drop including the circuit and the load. This is so arranged that under normal conditions the throwing of the proper load switch, no matter which circuit is energizing the unit, causes the D. C. meter to drop back a given amount, say one-fifth or one-fourth of a volt. If the deflection is more than this it is an indication that the resistance in the circuit is abnormally high. It will be apparent that the use of the different loads eliminates the necessity for the inspector's thinking in terms of different deflections for different circuits, the deflection for a normal circuit being the same no matter which voltage is energizing it.

Having completed his tests on the first outlet and having found it in order, the inspector would then test the next outlet, as for example the outlet indicated as 62. It will be apparent from the diagram that both connections have inadvertently been made to the same side of the circuit, so that the center terminal and shell of the socket are tied together and connected to the wire 47. This error will be apparent from the fact that the D. C. meter fails to read in either normal or polarity reversing position. The only other outlet in the kitchen might be an appliance outlet, for example, and the inspector would then switch connectors and use the one with a bayonet plug. If this outlet is assumed to be the one indicated in the diagram as 63, it would then be connected to the test unit in the manner shown by the dotted lines 64 and 65. Under the conditions shown in the drawings the meter would read 4.2 volts, indicating that this appliance outlet is on circuit No. 2, and that there was continuity of circuit connections to the outlet. The minute load switch 16 was thrown to upper or No. 2 position, however, there would be an abnormal deflection of the meter 13 because of the improper or high resistance connection at this outlet, here indicated schematically by the resistance 66, this being another defect to be noted on the data sheet.

The inspector might then move on into some other room, as for example a dining room, and plug the connector used for sockets into a socket outlet here indicated as 67, the connections to the wires 50 and 51 being indicated by the dotted lines 68 and 69. This outlet 67 is shown directly connected in circuit No. 4, but also improperly connected (indicated by the dotted line 70) to the live wire of circuit No. 2. Such an improper or cross connection might occur at a junction box or some other point where the circuits come together or cross each other. It would be indicated on the meter 13 by a reading which was neither 8.4 volts nor 4.2 volts, but some intermediate voltage. That is, under open circuit conditions without the load thrown in the voltage readings on any properly connected outlet will be exact multiples of 2.1 where that is the voltage of the standard wet cells used; and any intermediate voltages, when the load switches are in neutral position, will indicate a cross connection. While the outlets described and illustrated have been shown to have various kinds of volts therein, it will be understood that this will be relatively unusual in the average installation. That is, outlet 71 and the other outlets not heretofore specially described, are all shown properly connected, and in each case if the instrument were applied to them it would show the circuit they were on, that the polarity of the connections was correct, and that the circuit to the outlet was complete and of proper low resistance. It is only where the wiring has become old and defective, or where its installation has been improper that defects would show up. As will be apparent from the foregoing description, any defects present in the installation are indicated by my instrument in a convenient manner enabling quick and thorough testing of the wiring.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus of the character described for testing a plurality of electrical circuits originating at a common point and adapted to energize a plurality of outlets, including: readily portable means adapted to energize each of said circuits simultaneously with a different predetermined voltage after the circuits have been disconnected from their normal supply source; and a readily portable unit adapted to be connected to any outlet under test, said unit including means for indicating the voltage at such outlet to enable determination of the circuit to which it is connected, and an accurately predetermined load adapted to be connected in shunt with the indicating means to enable determination of the condition of the circuit by the voltage drop therein.

2. Apparatus of the character claimed in claim 1, wherein said unit includes a plurality of loads, each being adapted to cooperate with one of said different voltages.

CHARLES M. HORHAM.